(12) United States Patent
Maier

(10) Patent No.: US 6,820,583 B2
(45) Date of Patent: Nov. 23, 2004

(54) INTERNAL COMBUSTION ENGINE

(75) Inventor: Frank Maier, Ditzingen-Hirschlanden (DE)

(73) Assignee: Dr. Ing. h.c.F. Porsche Aktiengesellschaft, Stuttgart (DE)

(*) Notice: Subject to any disclaimer, the term of this patent is extended or adjusted under 35 U.S.C. 154(b) by 51 days.

(21) Appl. No.: 10/307,507

(22) Filed: Dec. 2, 2002

(65) Prior Publication Data

US 2003/0127066 A1 Jul. 10, 2003

(30) Foreign Application Priority Data

Dec. 1, 2001 (DE) .......................... 101 59 087

(51) Int. Cl.$^7$ ................................. F01M 1/00
(52) U.S. Cl. ................................. 123/196 R
(58) Field of Search .............. 123/195 C, 196 R, 123/198 R, 198 C, 195 A, 196 S

(56) References Cited

U.S. PATENT DOCUMENTS

| 5,000,142 A | * | 3/1991 | Aruga et al. | ............ 123/195 C |
| 5,078,106 A | | 1/1992 | Matsuo et al. | |
| 5,190,005 A | | 3/1993 | Saito et al. | |
| 5,191,859 A | | 3/1993 | Fujiwara | |
| 5,791,311 A | | 8/1998 | Ozeki | |

FOREIGN PATENT DOCUMENTS

DE 19630545 A1 2/1997

OTHER PUBLICATIONS

Fachkunde Kraftfahrzeugtechnik, p. 323, Europa–Lehrmittel Publishers, 26th Edition.
European Search Report mailed Dec. 5, 2003.

* cited by examiner

Primary Examiner—Tony M. Argenbright
Assistant Examiner—Hyder Ali
(74) Attorney, Agent, or Firm—Crowell & Moring LLP

(57) ABSTRACT

An internal combustion engine includes a crankcase in which a crankshaft is held. An oil guide housing is positioned beneath the crankcase, and an oil pump with a drive sprocket for supplying lubricating oil is positioned in the crankcase. The oil pump supplies lubricating oil to consumers from an oil trap in the oil guide housing. The sprocket is encompassed by a cover, and resources are provided in the sprocket cover for scraping/separating lubricating oil that has been drawn along out of the oil trap in the direction of the crankcase by a chain that drives the sprocket. In this manner, the lubricating oil that is drawn and/or carried along by the drive chain is prevented from entering the crankcase and/or the cylinder head of the internal combustion engine.

4 Claims, 3 Drawing Sheets

INTERNAL COMBUSTION ENGINE

This application claims the priority of German application 101 59 087.3, filed Dec. 1, 2001, the disclosure of which is expressly incorporated by reference herein.

Reference is also made to co-pending U.S. application Ser. No. 10/307,525, filed on the same date as the present application, titled "INTERNAL COMBUSTION ENGINE".

BACKGROUND AND SUMMARY OF THE INVENTION

The present invention relates to an internal combustion engine including a crankcase in which a crankshaft is held, an oil guide housing positioned beneath the crankcase, and an oil pump equipped with a drive sprocket for supplying lubricating oil positioned in the oil guide housing, and in which the oil pump supplies lubricating oil to consumers from an oil trap in the oil guide housing.

In forced-feed lubrication of an internal combustion engine, the process of positioning a required oil pressure pump underneath the crankshaft in an oil guide housing and/or in an oil pan (see e.g., Fachkunde Kraftfahrzeugtechnik, page 323 ff., Europa—Lehrmittel Publishers, 26$^{th}$ Edition), is known. The oil pressure pump is preferably driven via a chain drive that is driven by the crankshaft.

The problem with such a system is that the drive chain and/or the drive gear for the oil pressure pump is partially immersed in the oil trap; hence the oil is drawn along by the drive chain. The lubricating oil carried along by the chain results in undesirable foaming of the oil in the crankcase; this problem is perpetuated within the cylinder head housing when the lubricating oil is further carried forward by a timing chain that drives the camshaft in the cylinder head housing.

It is thus one object of the invention to prevent lubricating oil that is drawn along by the drive chain in the oil pump from escaping from the oil trap in the crankcase and/or entering the cylinder head of the internal combustion engine.

This object is attained by having the sprocket encompassed by a cover, and providing elements on the sprocket cover for scraping, separating, or scraping and separating lubricating oil that is drawn along by a chain, driven by the sprocket, out of the oil trap in the direction of the crankcase.

By providing the oil pressure pump with a sprocket cover that is equipped with a base for stripping and/or separating the lubricating oil being drawn along by the chain, the lubricating oil that is drawn along and/or carried over by the drive chain will be returned to the oil trap and/or will not enter the crankcase or the cylinder head housing.

Further advantageous embodiments of and improvements on the internal combustion engine specified are reflected in dependent claims.

The sprocket cover is advantageously provided with openings in the area of the chain guide, wherein the rims of these openings serve as oil-scraping edges for the lubricating oil.

The sprocket cover is pot-shaped in design and equipped with a circumferential side panel, in which the openings provided with the oil-scraping edges are positioned.

In an advantageous manner, the revolving drive chain is fed through a number of the openings that are equipped with the oil-scraping edges.

One embodiment of the invention is specified in greater detail in the following description and in the drawings.

DETAILED DESCRIPTION OF THE INVENTION

Figure 1:
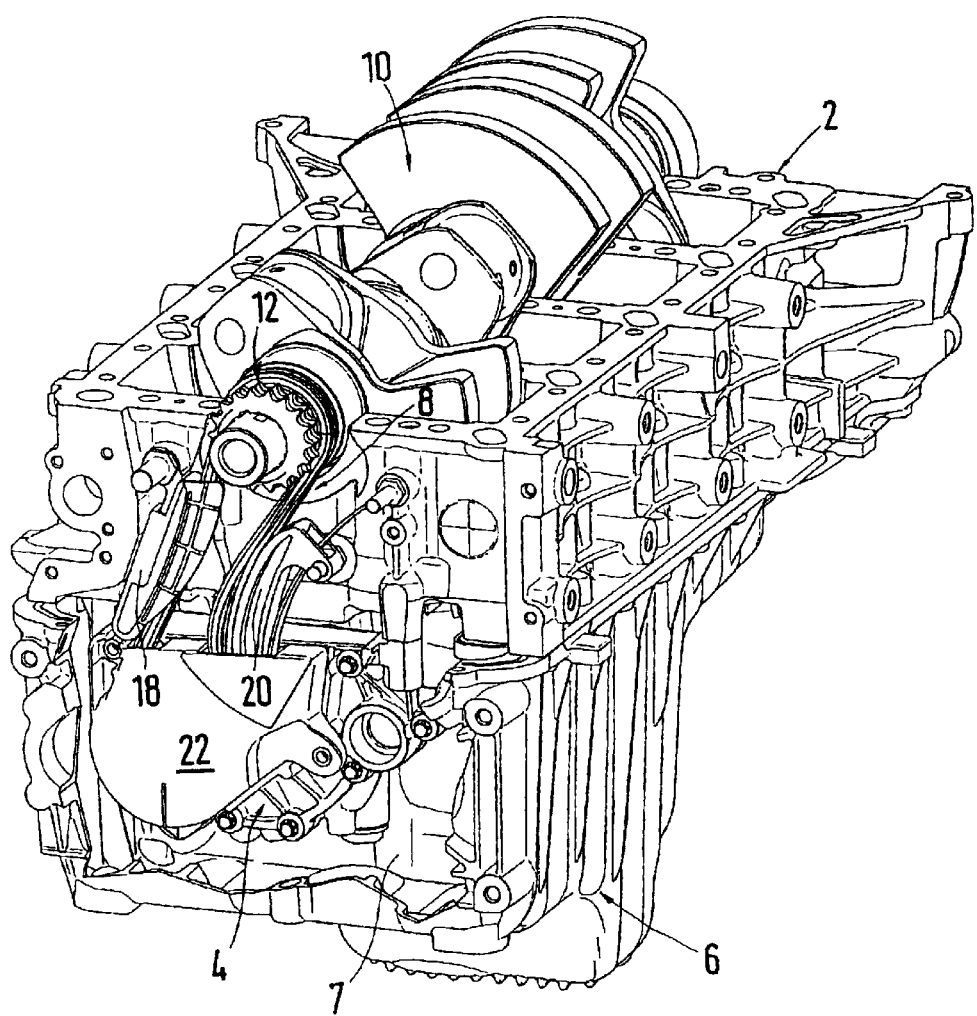
FIG. 1 is a perspective view of part of an internal combustion engine containing an oil pump drive.
Figure 2:
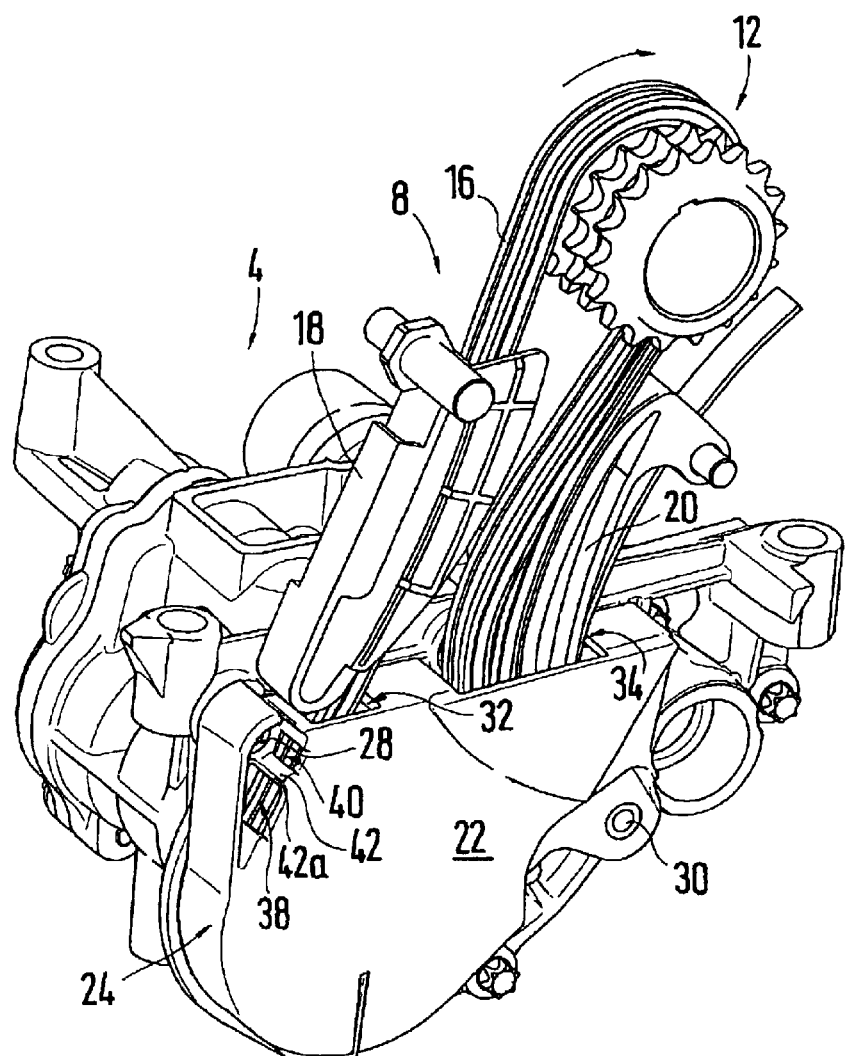
FIG. 2 is an enlarged view of the oil pump with a sprocket cover.
Figure 3:
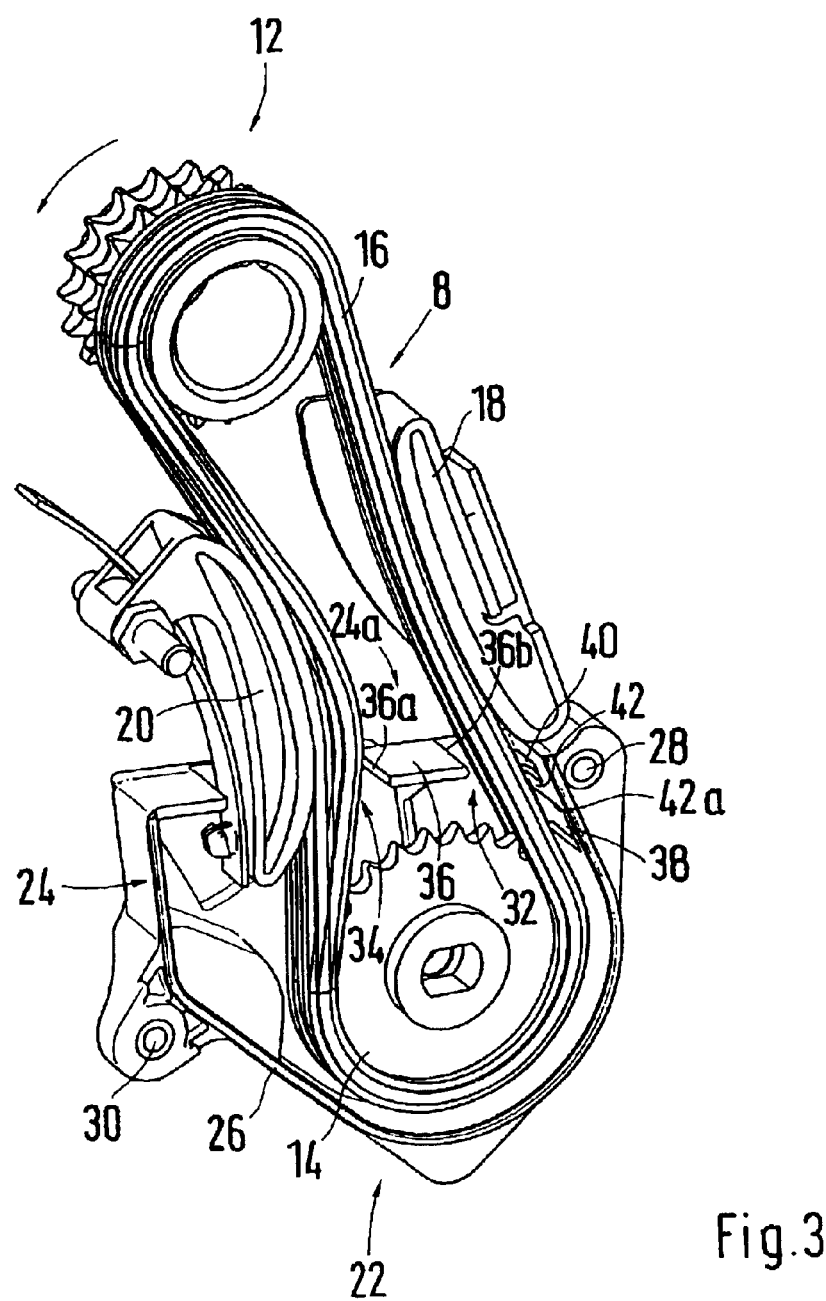
FIG. 3 is an inside view of the sprocket cover.

An oil pressure pump 4 for supplying lubricating oil to the internal combustion engine is mounted on the base 2 of a crankcase. As is apparent from the sectional view in FIG. 1, the oil pump 4 is positioned in an oil guide housing 6, which is itself mounted on the base 2 of the crankcase. An oil trap 7 is provided in the oil guide housing 6 for supplying lubricating oil to the main bearing of the crankshaft 10, the crankshaft-end bearing, etc. To drive the oil pump, a chain drive 8 is provided, which is comprised of a drive gear 12 attached to the crankshaft 10, a sprocket 14 mounted on the drive shaft of the oil pump 4, and a drive chain 16 that loops around both gears 12, 14 and is designed as a continuous drive. The drive gear 12 is designed as a triple gear, wherein the two gears that do not have the drive chain 16 looped around them serve to drive camshafts positioned in the cylinder head housing of the internal combustion engine via a double roller chain (components are not illustrated in the diagrams). The drive chain 16 is limited in its load-bearing side (crankshaft rotating in a clockwise direction) by a chain guide rail 18, while a chain adjuster rail 20 is positioned on the idle side. The sprocket 14 that drives the oil pump 4 is provided with a sprocket cover 22, which extends essentially up to the flange surface of the oil pump 4—crankcase base 2. The sprocket cover 22, which may be made of an aluminum diecast component, for example, is equipped with a circumferential side panel 24, the end surface 26 of which lies adjacent to a housing surface of the oil pump 4 when mounted. The housing surface (not illustrated here) is provided with a circumferential groove, into which the end face 26 of the side panel, which is provided with a tongue, becomes engaged in accordance with the tongue and groove principle. To fasten the sprocket cover 22 to the oil pump housing, two mounting eyes 28 and 30 are provided. An upper wall panel 24a of the circumferential side panel 24 is equipped with two rectangular openings 32 and 34, wherein the load-bearing side of the drive chain 16 is fed through the opening 32, and the idle side of the drive chain 16 is fed through the opening 34. A portion of the chain adjuster rail 20 is also taken up in the opening 34. Between the two openings 32 and 34, a central tongue 36 is provided, the left and right edges 36a and 36b of which are provided as oil-scraping edges for the lubricating oil that is drawn along by the drive chain 16 out of the oil guide housing 6 and/or the oil trap 7.

Two additional rectangular openings 38 and 40 in the side panel 24 are provided in the area of the mounting eye 28. The two openings 38, 40 are separated from each other by a tongue 42, wherein especially the lower terminating edge 42a of the tongue 42 also acts as an oil-scraping edge for the lubricating oil that is drawn along by the drive chain 16 in the direction of the crankcase 2. The lubricating oil that is scraped off by the oil-scraping edges 36a, 36b, and 42a is returned to the oil trap 7 or is once again taken up by the drive chain 16, where it is again "shaved off," and hence does not reach the crankcase or the cylinder head of the internal combustion engine.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

I claim:

1. An internal combustion engine comprising:

a crankcase in which a crankshaft is held, an oil guide housing positioned beneath the crankcase, and an oil pump equipped with a drive sprocket for supplying lubricating oil positioned in the oil guide housing, said oil pump supplying lubricating oil to consumers from an oil trap in the oil guide housing, wherein the sprocket is encompassed by a cover, wherein elements are provided on the sprocket cover for scraping, separating, or scraping and separating lubricating oil that is drawn alone by a chain, driven by the sprocket, out of the oil tray in the direction of the crankcase, and wherein the sprocket cover is equipped with openings having the elements, and wherein said elements are oil-scraping edges.

2. The internal combustion engine according to Claim 1, wherein the openings that are provided with the oil-scraping edges are positioned in a circumferential side panel of the sprocket cover.

3. The internal combustion engine according to claim 1, wherein the chain is a revolving drive chain extending through some of the openings.

4. The internal combustion engine according to claim 2, wherein the chain is a revolving drive chain extending through some of the openings.

* * * * *